US 12,173,646 B2

(12) United States Patent
Escure et al.

(10) Patent No.: US 12,173,646 B2
(45) Date of Patent: Dec. 24, 2024

(54) CONSTANT VOLUME TURBOMACHINE COMBUSTION CHAMBER

(71) Applicant: SAFRAN AIRCRAFT ENGINES, Paris (FR)

(72) Inventors: Didier René André Escure, Moissy-Cramayel (FR); Nicolas Jérôme Jean Tantot, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/626,637

(22) PCT Filed: Jul. 8, 2020

(86) PCT No.: PCT/FR2020/051211
§ 371 (c)(1),
(2) Date: Jan. 12, 2022

(87) PCT Pub. No.: WO2021/009439
PCT Pub. Date: Jan. 21, 2021

(65) Prior Publication Data
US 2022/0260012 A1    Aug. 18, 2022

(30) Foreign Application Priority Data

Jul. 15, 2019  (FR) ...................................... 1907970

(51) Int. Cl.
*F02C 5/12*    (2006.01)
*F23R 7/00*    (2006.01)

(52) U.S. Cl.
CPC . *F02C 5/12* (2013.01); *F23R 7/00* (2013.01)

(58) Field of Classification Search
CPC .................................... F02C 5/12; F23R 7/00
See application file for complete search history.

(56) References Cited

U.S. PATENT DOCUMENTS 2,579,321 A     12/1951  Kadenacy
2,594,765 A  *   4/1952  Goddard ................... F02K 7/06
                                                   60/915

(Continued)

FOREIGN PATENT DOCUMENTS

GB         1222272 A    2/1971

OTHER PUBLICATIONS

Search Report issued in French Patent Application No. 1907970 dated Feb. 13, 2020.

(Continued)

*Primary Examiner* — Ted Kim
(74) *Attorney, Agent, or Firm* — Pearne & Gordon LLP

(57) ABSTRACT

A combustion chamber of an aircraft turbomachine having a main axis includes: a body of revolution coaxial with the main axis having a plurality of combustion tubes extending mainly in the direction of the main axis and being distributed in a ring about the main axis; a first perforated rotary disc mounted at a first axial end of the body and rotatable about the main axis to selectively open or close a first end of each of the combustion tubes; and a second perforated rotary disc mounted at a second axial end of the body and rotatable about the main axis to selectively open or close a second end of each of the combustion tubes. The body includes a plurality of cooling segments extending mainly in the direction of the main axis, which are distributed in a ring about the main axis and around the combustion tubes.

8 Claims, 4 Drawing Sheets

(56) References Cited

U.S. PATENT DOCUMENTS

| | | | | |
|---|---|---|---|---|
| 2,667,032 A * | 1/1954 | Boulet | ............ | F23R 7/00 60/39.38 |
| 2,898,736 A * | 8/1959 | Ely | ............ | F02K 3/00 60/39.37 |
| 2,928,242 A | 3/1960 | Emmerich | | |
| 3,154,968 A * | 11/1964 | Daugherty | ............ | F16H 37/00 74/625 |
| 3,494,127 A * | 2/1970 | Brille | ............ | F02C 5/12 60/39.39 |
| 3,501,913 A * | 3/1970 | Brille | ............ | F02C 5/12 60/39.76 |
| 4,570,438 A | 2/1986 | Lorenz | | |
| 5,522,217 A * | 6/1996 | Zauner | ............ | F23R 3/56 60/39.45 |
| 6,062,018 A * | 5/2000 | Bussing | ............ | F02K 7/075 60/39.181 |
| 7,137,243 B2 * | 11/2006 | Snyder | ............ | F02C 5/12 60/39.38 |
| 2002/0068250 A1 * | 6/2002 | Nalim | ............ | F02C 3/16 431/181 |
| 2003/0131584 A1 * | 7/2003 | Butler | ............ | F02K 7/075 60/226.1 |
| 2004/0154306 A1 * | 8/2004 | Benians | ............ | F02C 5/12 60/39.38 |
| 2012/0017563 A1 * | 1/2012 | Aguilar | ............ | F02C 5/12 60/39.76 |
| 2015/0128599 A1 * | 5/2015 | Snyder | ............ | F02C 5/12 60/734 |
| 2017/0036661 A1 * | 2/2017 | Ohishi | ............ | F02C 5/12 |
| 2018/0356093 A1 | 12/2018 | Pal et al. | | |

OTHER PUBLICATIONS

International Search Report for issued in Application No. PCT/FR2020/051211 dated Oct. 5, 2020.
Written Opinion for PCT/FR2020/051211 dated Oct. 5, 2020.

* cited by examiner

CONSTANT VOLUME TURBOMACHINE COMBUSTION CHAMBER

This is the National Stage of PCT international application PCT/FR2020/051211, filed on Jul. 8, 2020 entitled "CONSTANT-VOLUME TURBOMACHINE COMBUSTION CHAMBER", which claims the priority of French Patent Application No. 1907970 filed Jul. 15, 2019, both of which are incorporated herein by reference in their entirety.

TECHNICAL AREA

The invention relates to a combustion chamber for an aircraft turbomachine which is of the constant volume type.

The invention also relates to a turbomachine including such a combustion chamber.

STATE OF THE PRIOR ART

Unlike a conventional turbomachine combustion chamber, called "constant pressure", a constant volume combustion chamber for a turbomachine operates according to the intake—combustion—exhaust cycle, and for which the combustion is performed in a volume constant.

Such a constant volume combustion chamber comprises at the inlet thereof a compressed air intake valve, which is movable between an open position and a closed position, and comprises at the outlet thereof a burnt gas exhaust valve, which is also movable between an open position and a closed position.

The positions of the valves are driven in a synchronised manner in order to implement the three successive phases of the previously determined cycle.

An example of a constant volume combustion chamber consists of a cylindrical body having a main axis coaxial with the rest of the turbomachine.

This body thus includes a central conduit coaxial with its main axis which is permanently passed through by a portion of the compressed air flow and combustion tubes, each of which is intended to form a combustion volume.

The combustion tubes are parallel to the main axis of the body and are distributed in a ring about the main axis of the body.

The combustion chamber is of the "multi-tube" type.

It also includes an intake valve and an exhaust valve which cooperate with the two ends of each combustion tube to allow opening the duct so that it is passed through by the compressed air, or to seal it, partially or in part, to implement the phases of the previously mentioned cycle.

As the combustion chamber operates, the temperature peaks generated by the constant volume combustion modes lead to an increase in the overall temperature of the body by radiative effect.

This affects the mechanical strength of the set of combustion tubes, this situation being aggravated by the presence of shock waves in the combustion tubes.

The radially inner portion of the body is cooled by the compressed air circulating in the central conduit.

However, no arrangement is provided to cool the radially outer portion of the body.

The invention aims at proposing a combustion chamber allowing improving the overall thermal situation of the body.

DISCLOSURE OF THE INVENTION

The invention proposes an aircraft turbomachine combustion chamber having a main axis and including:

a body of revolution coaxial with the main axis in which a plurality of combustion tubes are formed, said combustion tubes extending mainly in the direction of the main axis of the body and being distributed in a ring about said main axis, a first perforated rotary disc which is mounted at a first axial end of the body and which is movable in rotation about the main axis to selectively open or close a first end of each of said combustion tubes, and a second perforated rotary disc which is mounted at a second axial end of the body and which is movable in rotation about the main axis to selectively open or close a second end of each of said combustion tubes, characterised in that the body includes a plurality of cooling segments which extend mainly in the direction of the main axis, which are distributed in a ring about said main axis and around the combustion tubes.

The presence of cooling segments distributed around the periphery of the combustion tubes allows the body to be cooled by the compressed air flow, at the outer periphery thereof.

Preferably, each rotary disc is coaxial with the main axis, includes a series of lumens intended to face one end of each combustion tube and in a selective manner, and includes a series of orifices intended to face one end of each cooling segment in a selective manner.

Preferably, the lumens and/or the orifices of each rotary disc are circular, elliptical, rectangular, oblong or ovoid in shape.

Preferably, each rotary disc includes the same number of lumens as orifices and the lumens are circumferentially offset relative to the orifices.

Preferably, the body is cylindrical and includes a radially central cylindrical housing and each rotary disc includes a central orifice which communicates with the associated end of the radially central cylindrical housing of the body.

The invention also relates to an aircraft turbomachine including a primary air flow path in which at least one compressor, a combustion chamber and at least one turbine are disposed, in the direction of air flow in the primary flow path, characterised in that the combustion chamber is a combustion chamber as previously defined.

Preferably, the turbomachine includes a shaft connecting one of said at least one compressor to one of said at least one turbine, said shaft being coaxial with the main axis of the body of the combustion chamber, and one and/or the other of the rotary discs is driven in rotation by said shaft.

Preferably, the turbomachine includes a shaft connecting one of said at least one compressor to one of the at least one turbine, said shaft being coaxial with the main axis of the body of the combustion chamber, and the turbomachine includes a drive member of one and/or the other of the rotary discs which is independent of said shaft.

Preferably, the turbomachine includes means for regulating the speed of rotation of one and/or the other of the rotary discs relative to the speed of rotation of said shaft.

Preferably, said regulating means are capable of immobilising the rotary discs in rotation about the main axis.

BRIEF DESCRIPTION OF THE DRAWINGS

Other features and advantages of the invention will become apparent on reading the following detailed description, for the understanding of which reference is made to the appended figures, among which.

DETAILED DISCLOSURE OF PARTICULAR EMBODIMENTS

Figure 1:
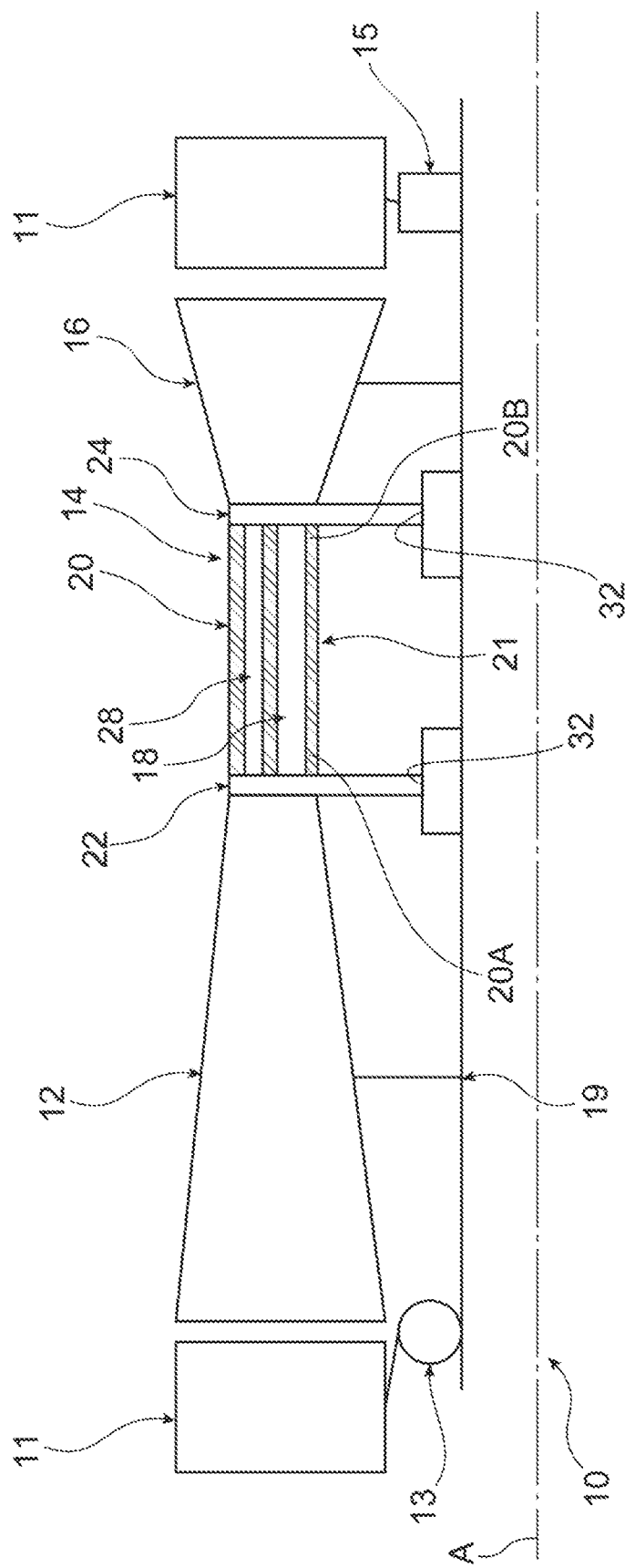
FIG. 1 is a schematic representation in axial half-section of a turbomachine including a constant volume combustion chamber according to the invention.

In FIG. 1, a turbomachine 10 is represented, for example an aircraft turbomachine.

The turbomachine 10 has a main axis A, which is an axis of revolution of the main rotating portions.

It includes, from upstream to downstream in the axial flow direction of a gas flow in the turbomachine 10, which is from left to right with reference to FIG. 1, a compressor 12, a combustion chamber 14 and a turbine 16.

It will be understood that the turbomachine 10 may include only one compressor 12, as represented, or else may include another compressor (not represented) arranged upstream of the compressor 12 represented in FIG. 1, the compressor 12 represented in FIG. 1 being a high pressure compressor, the upstream compressor being a low pressure compressor.

Likewise, the turbomachine 10 may include only one turbine 16 as represented, or else may include another turbine (not represented) arranged downstream of the turbine 16 represented in FIG. 1, the turbine 16 represented in FIG. 1 being a high pressure turbine, the downstream turbine being a low pressure turbine.

The turbine 16 is connected to the compressor 12 by a shaft 19. In the case of a turbomachine 10 including two compressors and two turbines, the low pressure turbine is connected to the low pressure compressor by an associated shaft (not represented) and the high pressure turbine 16 is connected to the high pressure compressor 12 by a high pressure shaft 19.

The turbomachine 10 further includes a fixed casing 11, which is herein represented by two rectangles, which aims at guiding the compressor 12, the turbine 16 and the shaft 19 in rotation in the turbomachine, in particular via a ball bearing 13 and a roller bearing 15.

The combustion chamber 14 is of the constant volume type, that is to say that it implements an intake—combustion—exhaust cycle for which the combustion is performed in a constant volume.

Figure 3:
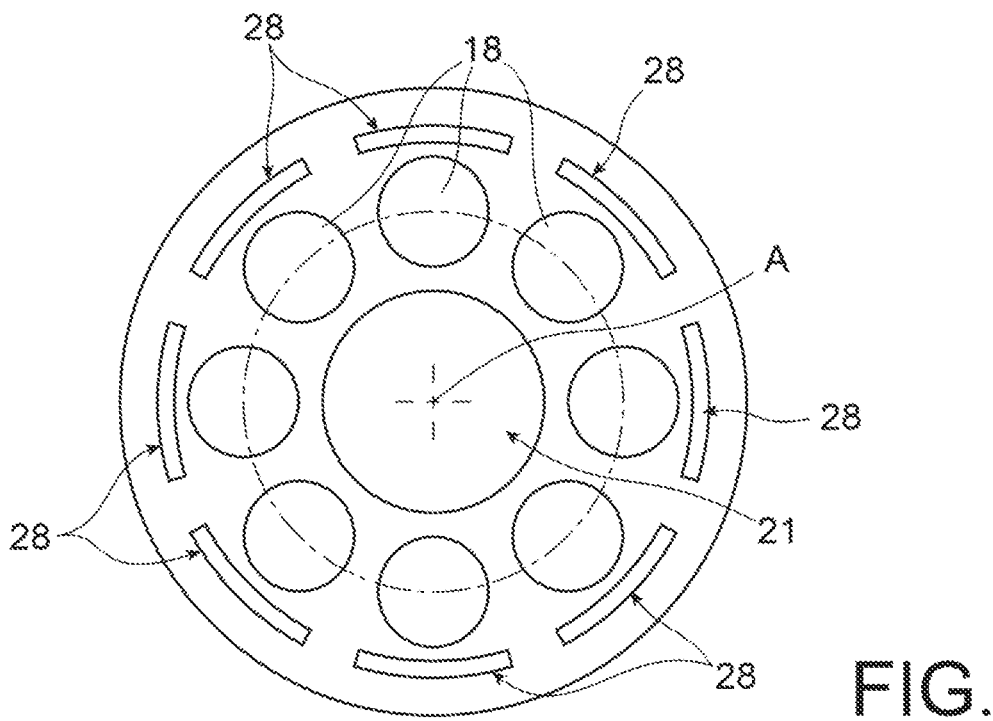
FIG. 3 is an end view of the body of the combustion chamber represented in FIG. 1, showing the different channels that it includes.

The combustion chamber 14 is also of the multi-tube type, that is to say that it includes a plurality of tubes 18 distributed in a ring about the main axis A of the turbomachine 10, in each of which a closed volume combustion is implemented, as shown in FIG. 3.

The tubes 18 extend mainly in the direction of the main axis A.

According to a preferred embodiment, all tubes 18 are rectilinear and parallel to the main axis A. They are further distributed regularly and equidistantly from each other and from each other to the main axis A, that is to say that they are distributed symmetrically about the main axis A to form a ring.

It will be understood that the invention is not limited to this embodiment and that the tubes 18 may not be rectilinear and/or parallel to the main axis A.

However, regardless of the embodiment, the tubes 18 are all arranged symmetrically relative to the main axis A, to form a ring.

The combustion chamber 14 includes a cylindrical body 20 in which the combustion tubes 18 are formed. The body 20 is coaxial with the main axis A and it includes a radially inner cylindrical housing 21 which is in particular intended to be passed through by the shaft 19 connecting the compressor 12 to the turbine 16.

Each upstream and downstream end of each combustion tube 18 is selectively open or closed according to the phase of the combustion cycle in which the combustion tube 18 is located.

For this, the combustion chamber 14 includes an upstream disc 22 which extends in a radial plane perpendicular to the main axis A, which is located at the upstream end 20A of the body 20 and a downstream disc 24 which extends in a radial plane perpendicular to the main axis A, which is located at the downstream end 20B of the body 20.

Preferably, the outer diameter of each disc 22, 24 is substantially equal to the outer diameter of the body 20.

Figure 2:
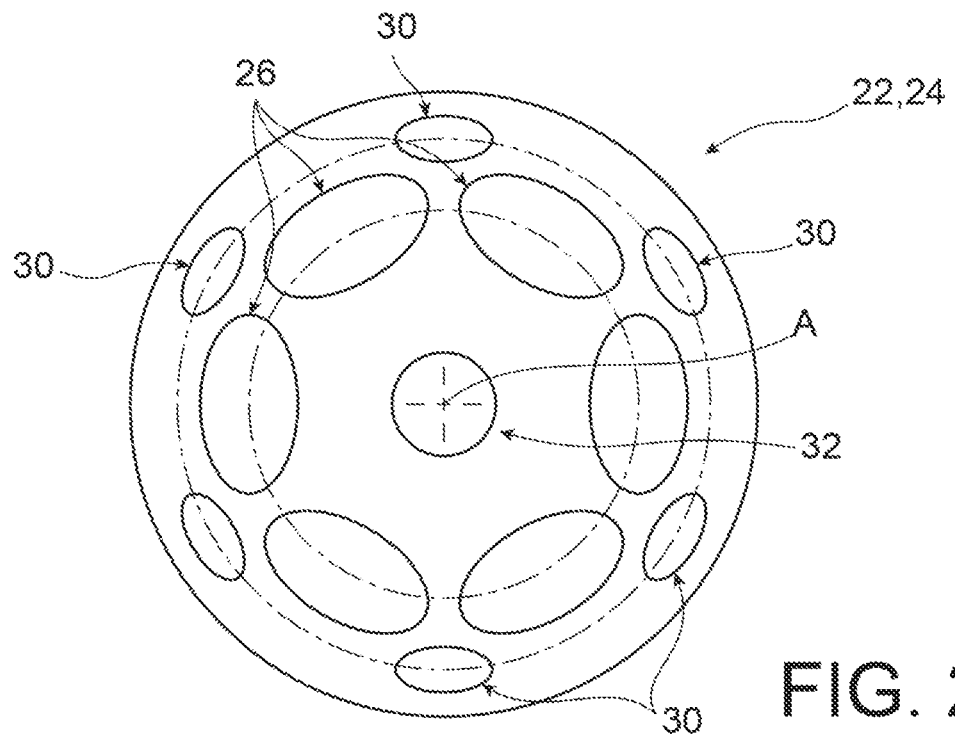
FIG. 2 is an end view of a rotary disc represented in FIG. 1.

As shown in FIG. 2, each disc 22, 24 includes a central orifice 32 which corresponds to the inner cylindrical housing 21 of the body 20, in order to not seal this housing and to allow the passage of the shaft 19 connecting the compressor 12 to the turbine 16.

Each disc 22, 24 includes a series of lumens 26 which are associated with the combustion tubes 18. According to one embodiment, each disc 22, 24 includes a number of lumens 26 less than the number of combustion tubes 18.

The lumens 26 are located at the same radial distance from the main axis A as the combustion tubes 18. Their circumferential dimensions and the circumferential distance between two consecutive lumens 26 are defined depending on the phases of the combustion cycle.

Each disc 22, 24 is movable in rotation about the main axis A so that the slots 26 selectively face the combustion tubes 18 in order to open or close them.

The body 20 also includes cooling segments 28 which are parallel to the main axis A and which are distributed in a ring around the combustion tubes 18. The cooling segments 28 are further open at each axial end of the body 20.

Herein, the number of cooling segments 28 is equal to the number of combustion tubes 18 and each cooling segment 28 is located circumferentially at a combustion tube 18 associated therewith.

It will be understood that the invention is not limited to this embodiment and that the body 20 can include a different number of cooling segments 28 relative to the number of combustion tubes 18 and that their position about the main axis A may be different from that represented in the Figures.

The cooling segments 28 are intended to be passed through by the compressed air flow originating from the compressor 12, in order to cool the radially outer portion of the body 20.

Each disc 22, 24 intended to seal the combustion tubes 18 is also intended to seal the cooling segments 28 in a selective manner.

Each disc 22, 24 thus includes a series of orifices 30 which are associated with the cooling segments 28.

The orifices 30 are located at the same radial distance from the main axis A as the cooling segments 28. Their circumferential dimensions and the circumferential distance between two consecutive orifices 30 are defined depending on the phases of the combustion cycle.

Herein, according to a preferred embodiment, the orifices 30 are circumferentially offset relative to the lumens 26.

Thus, a segment 28 is open when the combustion tubes 18 which are adjacent thereto are closed and conversely, a segment 28 is closed when the combustion tubes 18 which are adjacent thereto are open.

This allows in particular having a continuity of circulation of the air flow originating from the compressor 12, through each segment 28 or combustion tube 18.

According to a preferred embodiment represented in FIG. 3, the section of each combustion tube 18 is circular and the section of each segment 28 is in the form of an arc of a circle centred on the main axis A.

As shown in FIG. 2, in order to limit the shock waves and possible detachments during opening and closing the combustion tubes 18 and segments 28, the lumens 26 and the orifices 30 of the discs 22, 24 are elliptical or ovoid in shape, whose large dimension is oriented circumferentially relative to the main axis A.

According to one variant, the lumens 26 and the orifices 30 of the discs 22, 24 are circular in shape.

Different modes of driving the disks 22, 24 can be provided.

Figure 4:
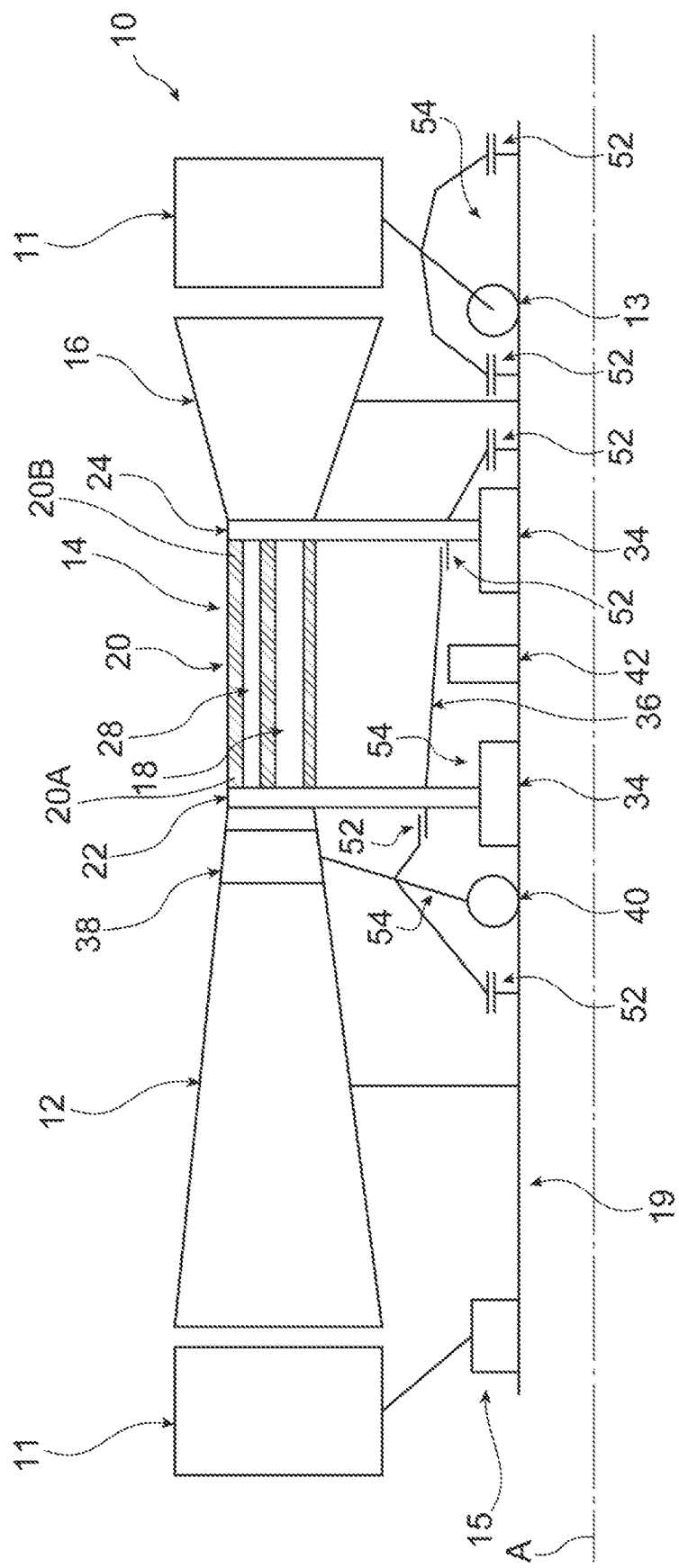
FIG. 4 is a view similar to that of FIG. 1, in which a speed reducer is interposed between each disc and the associated shaft.

For example, according to the embodiment represented in FIG. 4, a speed reducer 34 is interposed between each disc 22, 24 and the shaft 19 connecting the compressor 12 to the turbine 16.

The turbomachine 10 includes additional means 36 for guiding the discs 22, 24 in rotation about the main axis A, in particular a portion 38 of the fixed casing 11 which carries an axial stop 40 so as not to transmit the axial forces originating from the compressor 12 or the turbine 16.

This portion 38 of the fixed casing 11 also carries air and oil services supplying these additional guide means 36.

Also, a flexibility 42 is added to the shaft 19 to compensate for the possible axial displacements between the upstream portion of the turbomachine and the downstream portion of the turbomachine.

The flexibility 42 is preferably disposed axially between the two discs 22, 24.

Also sealing means 52 to air and oil are disposed between the various portions movable relative to each other.

Figure 5:
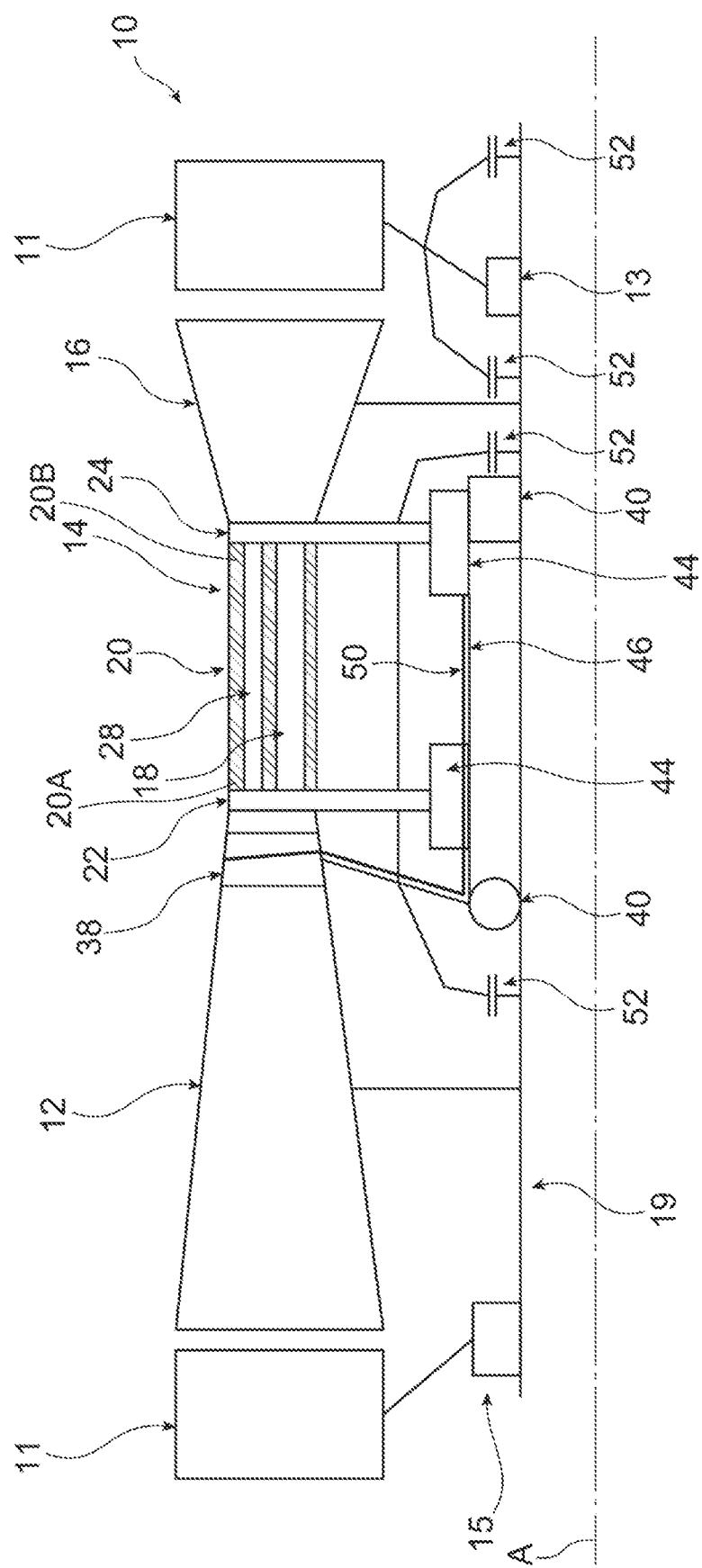
FIG. 5 is a view similar to that of FIG. 1, according to which the discs are driven by an independent actuator.

According to the embodiment represented in FIG. 5 and according to another embodiment of the modes of driving the disks 22, 24, an independent actuator 44, such as for example an electric motor or an air motor, drives each disk 22, 24.

The turbomachine 10 then includes a fixed structure 46 cooperating with the independent actuator 44 and a portion 38 of the fixed casing 11 which carries axial stops 40 so as not to transmit the axial forces originating from the compressor 12 or from the turbine 16.

This portion 38 of the fixed casing 11 also carries air and oil services 50 supplying these additional guide means 36.

Also sealing means 52 to air and oil are disposed between the various portions movable relative to each other.

These sealing means 52 delimit lubrication enclosures 54 receiving various equipment from the turbomachine 10.

By way of non-limiting example, with reference to FIG. 4, a first enclosure 54 is located axially upstream of the upstream disc 22 and it receives, among other things, the axial stop 40, a second enclosure 54 located axially between the two discs 22, 24 receives the flexibility 42 and a third enclosure 54 located downstream of the downstream disc 24 receives the ball bearing 13 for guiding the high pressure shaft 19.

According to the embodiment represented in FIG. 5, a first enclosure 54 is located axially at the combustion chamber 14 and receives the axial stop 40, the actuators 44 and the portion 38 of the fixed casing 11, a second enclosure 54 located downstream of the downstream disc 24 receives the ball bearing 13 for guiding the high pressure shaft 19.

These means for driving the disks 22, 24 can be disengageable to hold the disks 22, 24 in a defined position for which the combustion tubes 18 are permanently open, the combustion chamber then operates according to the Brayton cycle, that is to say at constant pressure.

The invention claimed is:

1. A combustion chamber of an aircraft turbomachine having a main axis and including:
    a body of revolution coaxial with the main axis in which a plurality of combustion tubes are formed, said combustion tubes extending mainly in the direction of the main axis of the body and being distributed in a ring about said main axis,
    a first perforated rotary disc which is mounted at a first axial end of the body and which is movable in rotation about the main axis to selectively open or close a first end of each of said combustion tubes, and
    a second perforated rotary disc which is mounted at a second axial end of the body and which is movable in rotation about the main axis to selectively open or close a second end of each of said combustion tubes,
    wherein the body includes a plurality of cooling segments which extend mainly in the direction of the main axis, which are distributed in a ring about said main axis and around the combustion tubes and are configured to cool a radially outer portion of the body, and
    wherein each cooling segment is open at each axial end of the body and is passed through by a compressed air flow,
    wherein each rotary disc is coaxial with the main axis, includes a series of lumens intended to face one end of each combustion tube and in a selective manner, and includes a series of orifices intended to face one end of each cooling segment in a selective manner,
    wherein each rotary disc is configured to selectively open or close a corresponding end of the cooling segments when the orifices are facing an associated axial end of the cooling segments.

2. The combustion chamber according to claim 1, wherein each rotary disc includes the same number of lumens as orifices, and wherein the lumens are circumferentially offset relative to the orifices.

3. The combustion chamber according to claim 1, wherein the body is cylindrical and includes a radially central cylindrical housing and each rotary disc includes a central orifice which communicates with the associated end of the radially central cylindrical housing of the body.

4. An aircraft turbomachine including a primary air flow path wherein at least one compressor, a combustion chamber and at least one turbine are disposed, in the direction of air flow in the primary flow path,
    wherein the combustion chamber is a combustion chamber according to claim 1.

5. The turbomachine according to claim 4, which includes a shaft connecting one of said at least one compressor to one of said at least one turbine, said shaft being coaxial with the main axis of the body of the combustion chamber, wherein one and/or the other of the rotary discs is driven in rotation by said shaft.

6. The turbomachine according to claim 5, which includes:
   a speed reducer interposed between each disc and the shaft to drive the discs.

7. The turbomachine according to claim 6, wherein the speed reducer is disengageable to hold the discs in a defined position.

8. The combustion chamber according to claim 1, wherein the lumens and/or the orifices of each rotary disc are elliptical or ovoid in shape.

* * * * *